United States Patent [19]

Ikeda et al.

[11] Patent Number: 5,133,319

[45] Date of Patent: Jul. 28, 1992

[54] ENGINE SPEED CONTROL APPARATUS

[75] Inventors: Hiroshi Ikeda, Kariya; Daiji Isobe; Yasuhito Takasu, both of Toyohashi, all of Japan

[73] Assignee: Nippondenso Co., Ltd., Kariya, Japan

[21] Appl. No.: 735,029

[22] Filed: Jul. 24, 1991

[30] Foreign Application Priority Data

Jul. 24, 1990 [JP] Japan .................... 2-195824

[51] Int. Cl.$^5$ ............... F02D 41/16; F02P 5/15
[52] U.S. Cl. ..................... 123/339; 123/418
[58] Field of Search ................ 123/339, 418

[56] References Cited

U.S. PATENT DOCUMENTS

| 4,492,195 | 1/1985 | Takahashi et al. | 123/339 |
| 4,638,778 | 1/1987 | ..nei et al. | 123/339 |
| 4,785,780 | 11/1988 | Kawai | 123/339 |
| 4,884,540 | 12/1989 | Kishimoto et al. | 123/339 |

FOREIGN PATENT DOCUMENTS 59-46353  3/1984 Japan .
59-138752 8/1984 Japan .

Primary Examiner—Tony M. Argenbright
Attorney, Agent, or Firm—Cushman, Darby & Cushman

[57] ABSTRACT

An engine speed control apparatus comprises: a first detector for detecting an engine speed; a second detector for detecting idling condition of the engine; a first setting circuit responsive to the first detector for setting a target engine speed; a second setting circuit responsive to the first detector for setting target ignition timing; a first integrator for obtaining a first integrated value of deviation of the engine speed from the target engine speed; a second integrator for obtaining a second integrated value of deviation of ignition timing from the target ignition timing; a third detector for detecting a flow rate of intake air; a determining circuit for determining a value of a predetermined state variable, presenting an internal condition of the engine according to the engine speed, the ignition timing, the flow rate of intake air; a third setting circuit for determining the flow rate of intake air supplied to the engine according to the value of the predetermined state variable, the first and second integrated values; and a fourth setting circuit for setting the ignition timing according to the value of the predetermined state variable, and the first and second integrations.

5 Claims, 6 Drawing Sheets

ENGINE SPEED CONTROL APPARATUS

BACKGROUND OF THE INVENTION

1. Field of the Invention

This invention relates to an engine speed control apparatus and particularly to an engine speed control apparatus for controlling an idling speed.

2. Description of the Prior Art

An engine speed control apparatus is known which determines a control amount as follows:

A value of a state variable presenting an internal condition of an engine is estimated through a given dynamic model in accordance with input and output control amounts. An engine speed of the engine is controlled in accordance with control inputs determined on the basis of the estimated value of the state variable, and integration values of deviation of the engine speed from a target speed.

FIG. 5 is a block diagram of a prior art dynamic model of an engine. In FIG. 5, a state variable representing an internal condition of the engine is estimated in accordance with one or more control input amounts (a flow rate of the intake air Duty, ignition timing Ig, a flow rate of fuel supply, an amount of exhaust feedback, etc.) and a control output amount (engine speed Ne) through the dynamic model including transfer functions G1(s) and G2(s). The control input is determined in accordance with the estimated value of the state variable and integrated values of deviation of the engine speed from a target engine speed. Such technique is disclosed in Japanese patent application provisional publication No. 59-145338.

Generally, the ignition timing should be set within a predetermined range so that vibrations and exhaust emissions of the engine can range within a tolerance. However, in the above-mentioned engine speed control apparatus of the engine, if one of control inputs is the ignition timing, it is not always possible to set the ignition timing within the tolerance. For example, when deviation of engine speed from a target speed is large, such as a transition state, the ignition timing is set to a value out of the predetermined range mentioned-above in order to control the engine speed to the target speed. Then, though the engine enters a stationary condition, the ignition timing is retained at the value which was set during the transition state, so that the ignition timing is not set within the tolerance during the stationary condition. Thus, there is a drawback that the resultant controllability decreases, such that vibrations becomes large and emissions become large.

SUMMARY OF THE INVENTION

The present invention has been developed in order to remove the above-described drawbacks inherent to the conventional engine speed control apparatus.

According to the present invention there is provided an engine speed control apparatus of an engine, comprising: an engine speed detector for detector an engine speed of the engine; a running condition detector for detecting a given running condition of the engine; a target speed setting circuit responsive to the running condition detector for setting a target engine speed; a target ignition timing setting circuit responsive to the running condition detector for setting target ignition timing; a first integration circuit for obtaining a first integrated value of deviation of the engine speed from the target engine speed; a second integration circuit for obtaining a second integrated value of deviation of ignition timing from the target ignition timing; an intake air detector for detecting a flow rate of intake air of the engine; a state variable determining circuit for determining a value of a predetermined state variable, presenting an internal condition of the engine in accordance with the engine speed, the ignition timing, the flow rate of intake air; an intake air flow rate setting circuit for determining the flow rate of intake air supplied to the engine in accordance with the value of the predetermined state variable, the first integrated value, the second integrated value; and an ignition timing setting circuit for setting the ignition timing in accordance with the value of the predetermined state variable, and the first and second integrated values.

BRIEF DESCRIPTION OF THE DRAWINGS

The object and features of the present invention will become more readily apparent from the following detailed description taken in conjunction with the accompanying drawings in which:

FIG. 4 is applied to idling speed control;

The same or corresponding elements or parts are designated as like references throughout the drawings.

DETAILED DESCRIPTION OF THE INVENTION

Hereinbelow will be described an embodiment of this invention.

Figure 2:
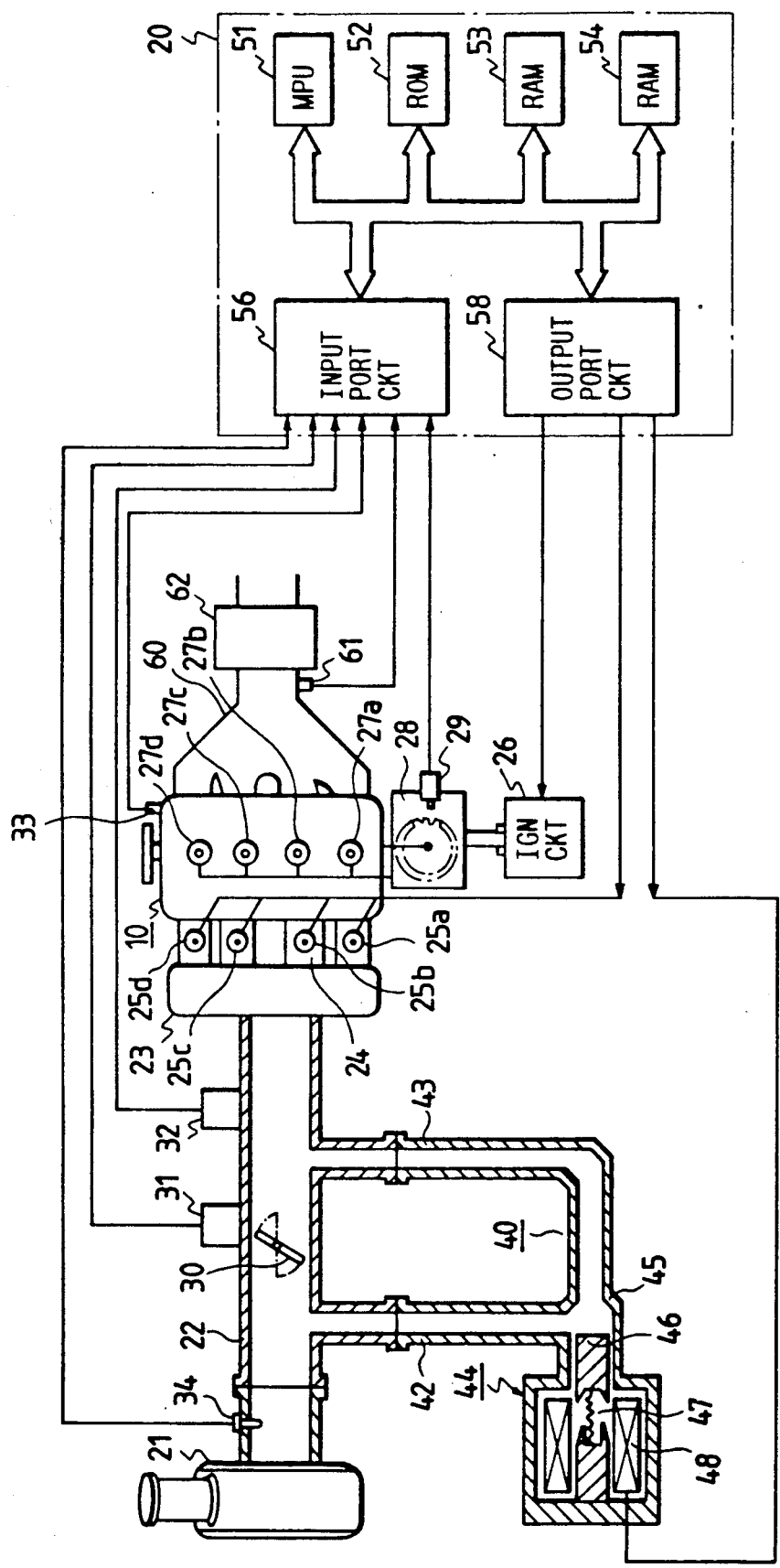
FIG. 2 is a block diagram of an embodiment of this invention of an engine speed control apparatus.

FIG. 2 is a block diagram of the embodiment of this invention of an engine speed control apparatus of an engine 10. The engine 10 is a spark-ignition-type four-cylinder four-cycle engine mounted on a vehicle. An electric control unit (ECU) 20 controls ignition timing, a flow rate of fuel supplied (air-fuel ratio), an idling speed, etc.

The intake air is introduced to each of cylinders through an air cleaner 21, an intake manifold 22, a surge tank 23, and an intake branched pipe 24. Fuel is supplied from a not-shown fuel tank with a pressure and is injected from fuel injection valves 25a-25c provided to the intake branched pipe 24.

There is provided to an exhaust manifold 60: an oxygen sensor 61 for detecting the air-fuel ratio of an air-fuel mixture supplied to the engine 10; and a catalytic converter rhodium 62 for cleaning deleterious substances (CO, HC, and NOx) included in an exhaust gas. As generally known, the oxygen sensor 61 outputs a different output voltage in accordance with whether the air-fuel ratio is rich or lean with respect to an ideal air-fuel ratio $\gamma$ 0.

A distributor 28 is provided to the engine 10, which distributes high voltage signals supplied from an ignition circuit 26 to each of ignition plugs 27a-27d provided to cylinders. In the distributor 28, an engine speed sensor 29 for detecting an engine speed Ne of the engine 10 is provided. A throttle sensor 31 is provided to the intake manifold 22 and is connected to a throttle valve 30 for detecting an opening degree TH of the throttle valve 30. Other sensors are provided as follows:

A pressure sensor 32 for detecting an intake air pressure PM downstream from the throttle valve 30 is provided to a downstream portion of the intake manifold 22. An intake air temperature sensor 34 for detecting an intake air temperature TAM is provided to an upstream portion of the intake manifold 22. An warm-up sensor 33 for detecting a temperature THW of cooling water of the engine 10 is provided to a body of the engine 10.

The engine speed sensor 29 is so provided as to confront a ring gear rotating with a crank shaft of the engine 10. It generates twenty-four pulses per one rotation of the engine 10, i.e., 720° CA (crank angle). Frequency of the pulses is proportional to the engine speed Ne. The throttle sensor 31 generates an analog signal whose intensity is proportional to the opening degree TH of the throttle valve 30 and an ON-OFF signal by an idle switch indicative of a full close state (idling state) of the throttle valve 30.

There is provided to an intake air system, a bypass passage 40 is so provided as to bypass the throttle valve 30 for controlling a flow rate of the intake air AR during idling of the engine 10. The bypass passage 40 comprises air passage pipes 42 and 43 and an air control valve (hereinbelow referred to as ISC valve) 44. The ISC valve 44 comprises a proportional electromagnetic type (linear solenoid) of a control valve which varies a cross-sectional area of an air passage between the air passage pipes 42 and 43 by controlling a position of a plunger 46 which is movable in a housing 45. The ISC valve 44 is so set that the plunger 46 allows the cross-sectional area to be zero by a compression coil spring 47. When an exciting current flows in an exciting coil 48, the plunger 46 is driven to open the air passage in the housing 45. An air flow rate of the bypass passage 40 is controlled by the exciting current. The exciting current is controlled by pulse width modulation (PWM). This ISC valve 44 is controlled by the ECU 20 together with the fuel injection valve 25a-25d and the ignition circuit 26. In addition to this, other types of valve can be used for this control, for example, a diaphragm-control valve or a step-motor driven valve.

The ECU 20 comprises a microprocessor 51, a read only memory (ROM) 52, a random access memory (RAM) 53, a backup RAM 54, an input port circuit 56, and an output port circuit 58. The input port circuit 56 receives signals from the above-mentioned various sensors and sends them to the microprocessor 51. The output port circuit 58 sends control signals from the microprocessor 51 to various actuators. The ECU 20 receives, through the input port circuit 56, an intake air flow rate AR, the intake air temperature TAM, the opening degree TH of the throttle 30, the temperature THW of cooling water, and the engine speed Ne, etc. to produce control signals to the fuel injection valves 25a-25d, the ignition circuit 26, and the ISC valve 44 through the output port circuit after it calculates a fuel supply rate TAU, ignition timing Ig, and the duty ratio DR for controlling opening degree of the ISC valve 44 in accordance with signals from the various sensor received through the input port chip 56.

The ECU 20 controls the idling speed of the engine 10 by controlling the ignition timing Ig, a bypass air flow rate (auxiliary air flow rate) Duty (opening degree DR of the ISC valve 44) so that the engine speed Ne as a control output is equal to the target engine speed Net as well as vibrations and exhaust emissions of the engine 10 ranges within a predetermined range by controlling the ignition timing Ig.

Hereinbelow will be described the idling speed control.

Figure 3:
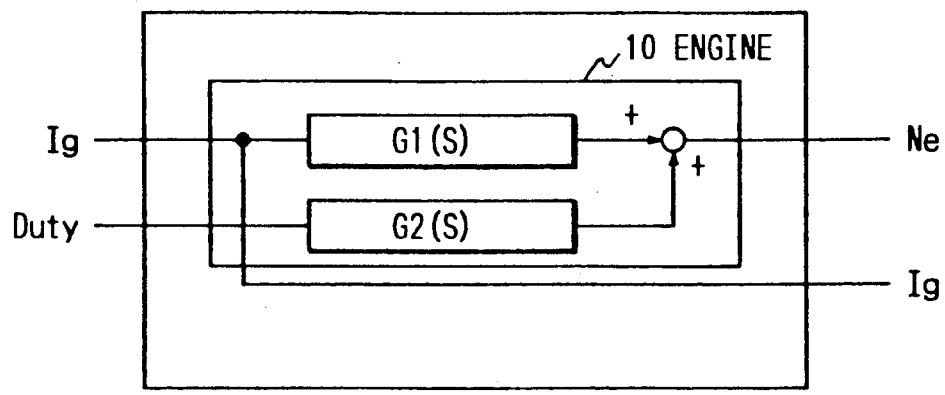
FIG. 3 is a block diagram of one example of a method for controlling the engine speed.

FIG. 3 is a block diagram of one example of a method for controlling the engine speed Ne to the target engine speed Net with the ignition timing Ig ranging within a predetermined range by directly outputting the ignition timing Ig which is one of control inputs. However, it is difficult to apply an algorithm of an optimum regulator to this controlled system which directly effects the control output in response to a control input. It is suggested to the inventor's mind that addition of a transfer function G3(S) between a control input supplied with ignition timing Ig and an output ignition timing output IgO for convenience makes application of the algorithm of the optimum regulator to the controlled system easier.

Figure 4:
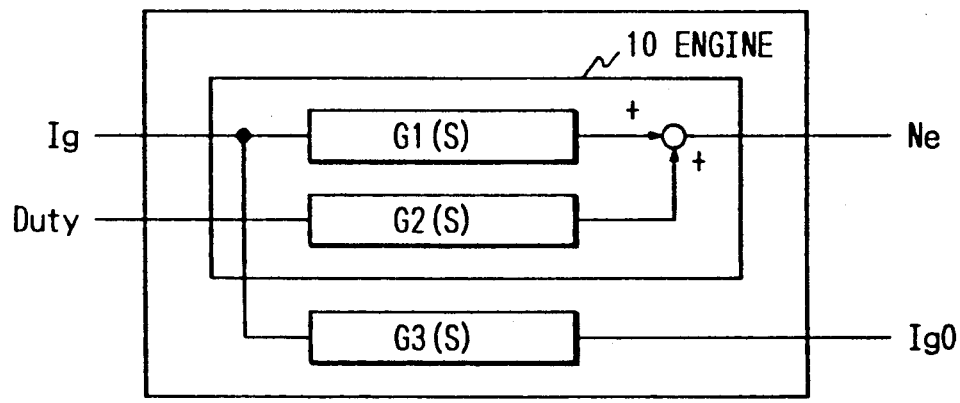
FIG. 4 is a block diagram of a controlled system of this embodiment.
Figure 6:
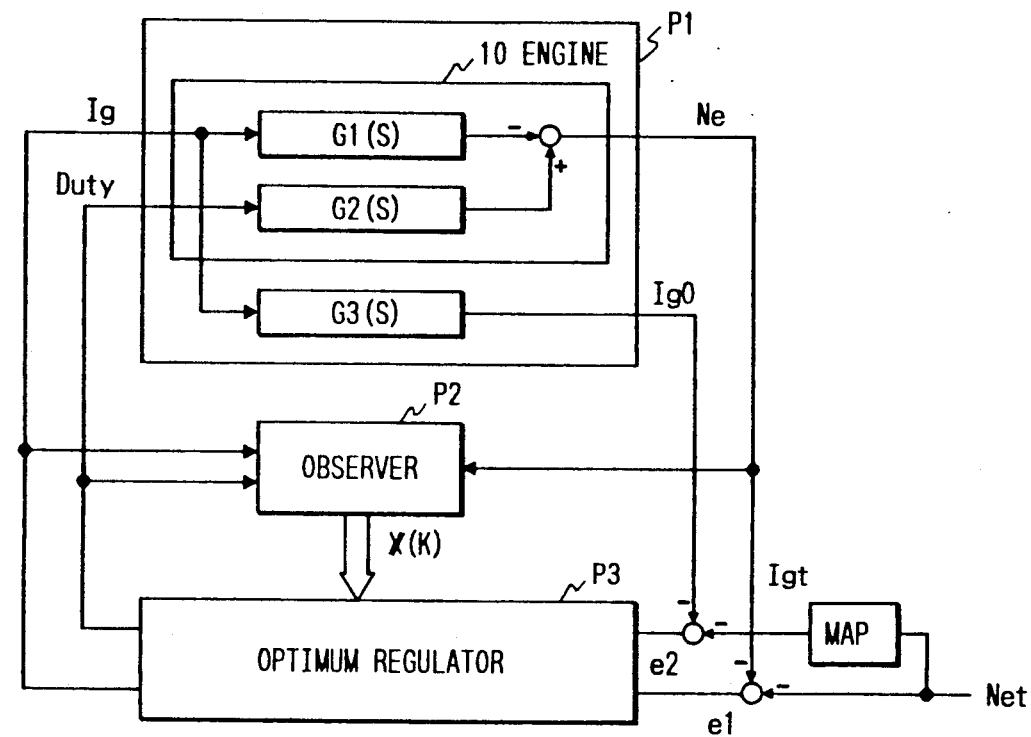
FIG. 6 is a block diagram of this embodiment of the invention wherein the controlled system shown

FIG. 6 is a block diagram of this embodiment of the invention wherein the controlled system shown FIG. 4 is applied to idling speed control. Hereinbelow will be described design of the controlled system shown in FIG. 6.

(A) Modeling of Controlled Object

Figure 5:
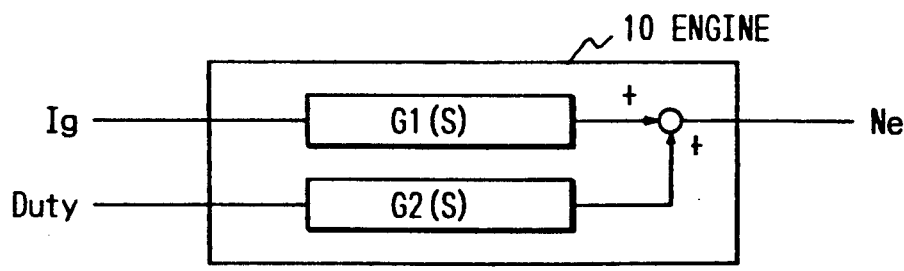
FIG. 5 is a block diagram of a prior art dynamic model of an engine.

As shown in FIG. 5, it is determined that the engine 10 as a controlled object is supplied with two control inputs, namely, the ignition timing Ig and auxiliary air flow rate Duty and outputs one output, namely, the engine speed Ne as a control output. Then, a dynamic model of the engine 10 is determined by an experiment, such as observing of step response.

In FIG. 5, a reference G1(S) is a first transfer function of the dynamic model, showing a relation between the ignition timing Ig and the engine speed Ne. A reference G2(S) is a second transfer function of the dynamic model, showing a relation between the auxiliary air flow rate Duty and the engine speed Ne. Actual control inputs and a control output are given as: an ignition timing deviation $\Delta$ Ig (=Ig−IgB; IgB is a reference ignition timing), an auxiliary air flow rate deviation $\Delta$ Duty (=Duty−DutyB; DutyB is a reference auxiliary air flow rate), and engine speed deviation $\Delta$ Ne (=Ne−NeB; NeB is a reference engine speed).

Generally, the second transfer function G2(S) includes a dead time element. An experiment was made with respect to a dynamic characteristic between the auxiliary air flow rate Duty and the rotational speed Ne. As the result, delay in phase due to the dead time within a interest frequency band of controlling is so small that it can be neglected. Therefore, in this embodiment, the dead time element is omitted in the dynamic model.

A state equation of the controlled object is given by:

$$X(t) = AX(t) + BU(t) \tag{1}$$

$$y(t) = [1\ 0]\ X(t)$$

-continued

Where $X^T(t) = [X1(t)\ X2(t)]$
$= [\Delta Ne\ X2(t)]$: the state variable amount $U^T(t) = [U1(t)\ U2(t)]$
$= [\Delta Ig\ \Delta Duty]$: control input amount $y(t)\quad S1(t) = \Delta Ne$ and $A$ and $B$ are $(2 \times 2)$ matrices.

(B) Improvement of the Model of the Controlled Object

As mentioned earlier, the above-mentioned dynamic mode was improved so that the ignition timing Ig is controlled to range within a predetermined range. As shown in FIG. 3, the ignition timing Ig is treated as a control output, so that the ignition timing Ig is converged into the target ignition timing Igt. A state equation of this controlled object is given by:

$$X(t) = AX(t) + BU(t)$$
$$y(t) = \begin{pmatrix} 1 & 0 \\ 0 & 0 \end{pmatrix} X(t) + \begin{pmatrix} 0 & 0 \\ 1 & 0 \end{pmatrix} U(t)$$
$$= \begin{pmatrix} \Delta Ne \\ \Delta Ig \end{pmatrix} \quad (2)$$

However, as mentioned earlier, it is difficult to apply the algorithm of the optimum regulator to the controlled object where the control input (ignition timing Ig) is directly outputted as a control output (ignition timing Ig). Therefore, the transfer function G3(S) is added to the dynamic model as shown in FIG. 4, so that the two-input one-output dynamic model is improved to two-input two-output dynamic model by providing a new control output of the ignition timing IgO for convenience. Actually, the ignition timing deviation amount $\Delta$ IgO is applied to the dynamic model, which is a deviation of the ignition timing from the reference ignition timing output value IgB. As mentioned above, improvement of the dynamic model enables control of the ignition timing Ig within the predetermined range as well as makes application of algorithm of the optimum regulator to the dynamic model easier.

In connection with a time constant, it is sufficient that a time constant of the transfer function G3(S) is set to a value over ten times the sampling frequency. Assuming that the target engine speed Net in the four-cycle engine is 1000 rpm, the sampling frequency is about 30 msec. Thus, in this emodiment, the time constant is set to 0.5 sec, so that the transfer function G3(s) is given by:

$G3(s) = 2/(S+2)$.

A state equation of the dynamic model of the engine 10 improved as mentioned above is given by:

$$X(t) = \begin{pmatrix} A & 0 \\ 0 & 0 \\ 00 & -2 \end{pmatrix} X(t) + \begin{pmatrix} B \\ 20 \end{pmatrix} U(t) \quad (3)$$
$$y(t) = \begin{pmatrix} 100 \\ 001 \end{pmatrix} X(t)$$

Where $X^T(t) = [X1(t)\ X2(t)\ X3(t)]$ and where X(t) in Equation (2), whose order is increased by one is set again as X(t) of Equation (3).

$y^T(t) = [X1(t)\ X3(t)]$
$= [\Delta Ne\ \Delta IgO]$

(C) Digitizing

The dynamic model of the engine 10 set as mentioned above, is digitized as follows:

An ignition frequency in the idling state, is about 30 msec in the case of the four-cycle engine. Accordingly, Equation (4) is given by digitizing Equation (3) with the sampling frequency assumed as 30 msec as follows:

$$X(k+1) = \Phi X(k) + PU(k) \quad (4)$$
$$y(k) = \begin{pmatrix} 100 \\ 001 \end{pmatrix} X(k)$$

Where $X^T(k) = [X1(k)\ X2(k)\ X3(k)]$.
$y^T(k) = [y1(k)\ y2(k)]$
$= [X1(k)\ X3(k)]$
$= [\Delta Ne\ \Delta IgO]$
$U^T(k) = [U1(k)\ U2(k)]$
$= [\Delta Ig\ \Delta Duty]$

(D) Design of an Add-integration Type Optimum Regulator

An add-integration type optimum regulator is designed with respect to Equation (4) with addition of an integration term for absorbing errors. Algorithm of the optimum regulator control including general mutivariable system is described in many publications, for example, "Linear system control theory", by Katuhisa Furuta, 1976, Shoukoudou. Therefore, only the result is shown:

$V(k) = U(k) - U(k-1)$ \hfill (5-1)

$E(k) = R(k) - y(k)$ \hfill (5-2)

An estimation function J is given by:

$$J = \sum_{k=0}^{\infty} (E^T(k)QE(k) + V^T(k)RV(k)) \quad (6)$$

Where k is the number of times of sampling which starts at an instance of beginning of control (k=0). Q and R are weighting parameter matrices and are design parameters.

$$U(k) = K \sum_{i=0}^{k} E(i) + FX(k) \text{ Where} \quad (7)$$

$$\sum_{i=0}^{k} E(i)$$

is an integration value of deviation of the control amount from the target; K are integration gains; and F are feedback gains.

Proper selection of the design parameters Q and R give the integration gains K and the feedback gains F which minimize the estimation function J. Generally, there is no method of determining the design parameters Q and R. Thus, the design parameters Q and R are determined by repetition of simulator until the optimum control characteristics is obtained.

Here, a characteristic of each of control inputs is considered as follows:

(I) Control of the ignition timing Ig shows rapid response. However, its control range is small.

(II) Control of the auxiliary air flow rate Duty does shows a slower response than the ignition timing Ig. However, its control range is large.

In consideration of the above-mentioned facts, in a transition state, such as when the target engine speed Net is changed or when an external load is changed, the design parameters Q and R are determined by mainly controlling the ignition timing Ig.

(E) design of the minimum order observer

It is necessary to determine the state variable X(k) in Equation (4) to calculate Equation (7). The state variable X(k) shows dynamic behavior of the controlled object and can be calculated by a state observer (observer).

A minimum order observer is used to obtain the state variables X(k) except one obtained as a control output. Because the algorithm of the minimum order observer is described in many publications, for example, "Observer" by Zenta Iwai, Akira Inoue, and Shigeho Kawaji, corona company, only its result is shown as follows:

When the controlled system is shown by:

$$\begin{rcases} X(k+1) = AX(k) + BU(k) \\ y(k) = C^T X(k) \end{rcases} \quad (8)$$

Where X(k) is $n^{th}$ order state vector, y(k) is $m^{th}$ order output vector, and U(k) is a $r^{th}$ input vector.

$(n-m)^{th}$ order minimum order observer is given by:

$$Z(k+1) = DZ(k) + Gy(k) + LU(k) \quad (9\text{-}1)$$

$$X(k) = PZ(k) + Jy(k) \quad (9\text{-}2)$$

Coefficient matrices in Equations (6-1) and (6-2) should satisfy the following equation:

$$\begin{rcases} HA - DH = GC^T, L = HB \\ PH + JC^T = I_n \end{rcases} \quad (10)$$

Where H is a given matrix $\{(n-m) \times n\}$, and is regular and D is an asymptotic stable matrix. $\bar{X}(k)$ relates a speed for convergence to the true value, the closer to zero the characteristic value, the faster the convergence speed.

Each of coefficient matrices G, L, P, and J can be calculated by determination of parameter matrices A, B, and $C^T$ and matrix H of the model of the controlled system represented by Equation (8), and a pole D of the observer.

In this embodiment, terms representing the state of the engine 10 in the state variable $X^T(k) = [X1(k) \ X2(k) \ X3(k)]$ are X1(k) and X2(k). X1(k) can be obtained from the control output directly. Only X2(k) is calculated by the minimum order observer. Thus, $$z(K+1) = d \cdot z(k) + g \cdot X1(k) + L \cdot u(k) \quad (11\text{-}1)$$

$$X2'(k) = z(k) + j \cdot X1(k) \quad (11\text{-}2)$$

where X2' (k) is an estimation value of X2(k).

Generally, a pole of an observer is determined to have a smaller value than a pole whose absolute value is the smallest out of poles of a closed-loop system. If the pole of the observer is brought closer to the origin of a unit circle, the convergence speed of the estimation value X'(k) to a true value X(k) will increase. However, the estimation value X'(k) will largely vibrates, because it responds to noises or the like incoming to the dynamic model sensitively. It should be avoided that the pole of the observer is set to around the origin because the variation of the engine speed during idling is considered as noise.

As mentioned above, (A) the modeling of the controlled system, (B) improvement of the model, (C) digitizing, (D) add integration optimum regulator, and (E) minimum order observer are described. In the actual idling rotational control, these control parameters are determined previously. The ECU 20 determines control inputs using Eqs. (5-2), (7), (11-1), and (11-2).

In FIG. 6, a block P1 is a controlled object including the engine 10 and the transfer function G3(s). A block P2 is the observer for detecting the state variable X(k) in accordance with the control inputs (the ignition timing Ig and the auxiliary air flow rate Duty) and control outputs (the engine speed Ne and the ignition timing output IgO) on the basis of the dynamic model of the controlled object. A block P3 is the optimum regulator for determining the control input in accordance with the state variable X(k) detected by the observer, the target values (the engine speed Net and the ignition timing Igt) and output values (engine speed Ne and ignition timing output value IgO) and deviations (the engine speed deviation e1 and the ignition timing deviation e2).

Figure 7:
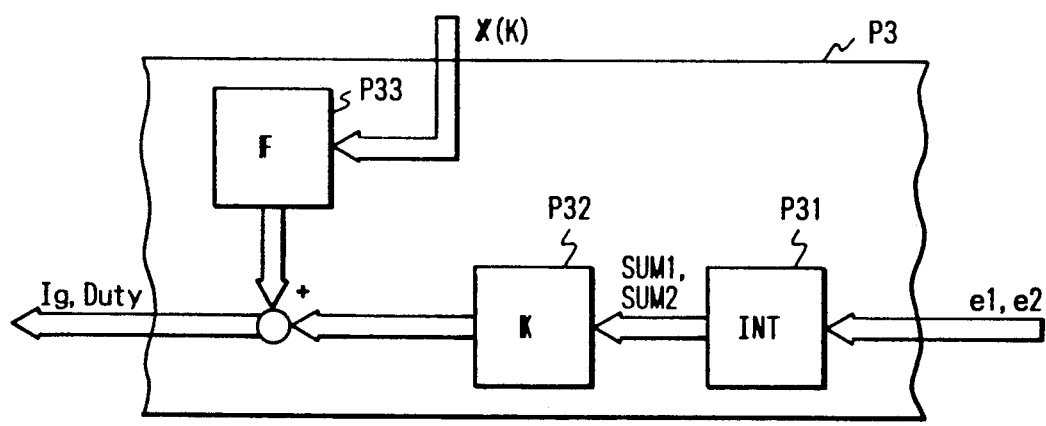
FIG. 7 is a block diagram of the optimum regulator shown in FIG. 6.

FIG. 7 is a block diagram of the optimum regulator shown in FIG. 6. In the optimum regulator shown in FIG. 7, a block P31 is an integrator for calculating integration values of deviations e1 and e2. A block P32 are integration gains k. A block P33 is optimum feedback gains F.

Figure 8:
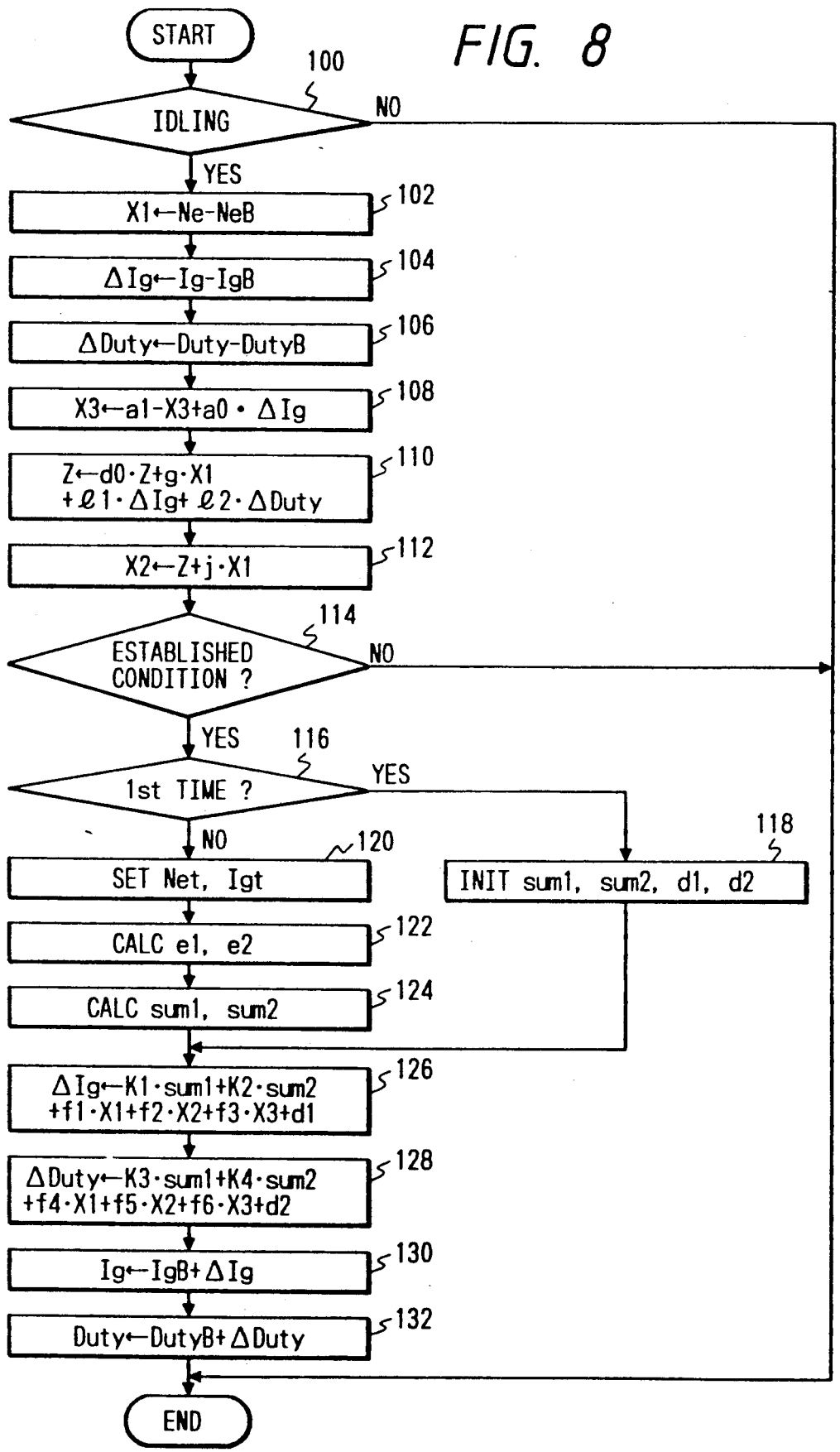
FIG. 8 shows a flow chart of the embodiment.

FIG. 8 shows a flow chart of the embodiment. Hereinbelow will be described operation of the engine speed control executed by the ECU 20.

This processing is executed at every predetermined interval. In step 100, the ECU 20 detects whether the state of the engine is in the idling state in accordance with the on-off signal from the idle switch of the throttle sensor 31 and with the engine speed, etc. If the state is not in the idling state, this processing ends.

If the engine 10 is in the idling state, processing proceeds to step 102. Steps 102-112 show operation of the observer for calculating X2 included in the equation of the state variable X(k)=[X1 X2 X3]. In step 102, the ECU 20 detects X1 which is a deviation of the engine speed Ne from the reference engine speed NeB (X1←Ne−NeB). The reference engine speed NeB is a given engine speed provided for convenience and it is desired that an engine speed Ne in idling (for, example 800 rpm) is set to the reference engine speed NeB.

In the following step 104, the ECU 20 detects the ignition timing deviation $\Delta$ Ig of the ignition timing Ig from the reference ignition timing IgB ($\Delta$ Ig=Ig−IgB). The reference ignition timing IgB is an ignition timing set in accordance with the reference engine speed NeB. In the succeeding step 106, the ECU 20 detects the auxiliary air flow rate deviation $\Delta$ Duty of the auxiliary air flow rate Duty from the reference auxiliary air flow rate B ($\Delta$ Duty=Duty−DutyB). The reference auxiliary air flow rate DutyB is an auxiliary air flow rate which is set in accordance with the reference engine speed NeB and the reference ignition timing IgB.

In the following step 108, the ECU 20 detects X3 which is a deviation of the ignition timing output value IgO determined by the ignition timing Ig and the transfer function G3(s) from the reference ignition timing IgB. It is given by:

$$X3 = a1 \cdot X3 + a0 \cdot \Delta Ig$$

Where a0 and a1 are constants determined in accordance with the transfer function G3(s). Assuming that the transfer function G3(s) is set as mentioned earlier as:

$$G3(s) = 2/(S+2)$$

and the sampling frequency is 30 msec, these constants a0 and a1 are as follows:

$$a0 = 0.0582$$

$$a1 = 0.942$$

In the following steps 110 and 112, the ECU 20 detects X2 by the minimum order observer. In step 110, the ECU 20 calculates z using Eq. (9-1) mentioned earlier.

$$z \leftarrow d0 \cdot z + g1 \cdot X1 + l1 \cdot \Delta Ig + l2 \cdot \Delta \text{Duty}$$

In step 112, the ECU 20 calculates X2 using Eq. (9-2).

$$X2 \leftarrow z + j1 \cdot X1$$

In the following step 114, the ECU 20 detects whether a feedback condition is established. If the feedback condition is not established. This processing ends.

If the feedback condition is established, processing proceeds to step 116. In step 116, the ECU 20 detects whether processing of this step is the first time or not. If YES, processing proceeds to step 118. In step 118, the ECU 20 initializes integration values sum1 and sum2 and compensation values d1 and d2.

$$\text{sum1} = \text{sum2} = 0$$

$$d1 = \Delta Ig - (f1 \cdot X1 + f2 \cdot X2'' + f3 \cdot X3)$$

$$d2 = \Delta \text{Duty} - (f4 \cdot X1 + f5 \cdot X2'' + f6 \cdot X3)$$

Where the compensation values d1 and d2 are for compensating control inputs calculated in steps 126 and 128 mentioned later so that these control inputs correspond to control output deviations at the beginning of feedback.

In step 116, when the answer is NO, processing proceeds to step 120. Steps 120-132 are processing of the optimum regulator. In step 120, the ECU 20 sets target values. More specifically, the target engine speed Net is set in accordance with the running state of the engines at that instant (for example, the temperature of the cooling water THW and various load conditions such as a load of an air-conditioner). Then, the ECU 20 sets the target ignition timing Igt corresponding to the target engine speed Net in step 120. This setting of the target ignition timing Igt can be executed by storing a set of values of the target ignition timing Igt corresponding to a set of values of the target engine speed Net in the ROM 52 and then reading out a value of the ignition timing Igt out of the set of the values of the ignition timing Igt with reference to the present value of the target engine speed Net.

In the following step 122, the ECU 20 detects deviations e1 and e2.

$$e1 \leftarrow \text{Net} - \text{Ne}$$

$$e2 \leftarrow \text{Igt} - \text{Ig}$$

In the succeeding step 124, the ECU 20 detects sum1 and sum2.

$$\text{sum1} \leftarrow \text{sum1} + e1$$

$$\text{sum2} \leftarrow \text{sum2} + e2$$

Steps 126-132 are processing for determining control input amounts in accordance with the value of the state variable X (k), integration values sum1 and sum2 and compensation values d1, d2. Steps 126 and 128 are for setting control input deviations. In step 126, the ECU 20 sets the ignition deviation $\Delta$Ig.

$$\Delta Ig \leftarrow k1 \cdot \text{sum1} + k2 \cdot \text{sum2} + f1 \cdot X1 + f2 \cdot X2 + f3 \cdot X3 + d1$$

In the following step 127, the ECU 20 obtains the auxiliary air flow rate deviation $\Delta$ Duty.

$$\Delta \text{Duty} \leftarrow k3 \cdot \text{sum1} + k4 \cdot \text{sum2} + f4 \cdot X1 + f5 \cdot X2 + f6 \cdot X3 + d2$$

In steps 126 and 128, K1-k4 are integration gains K, f1-f6 are the optimum feedback gains F.

Steps 130 and 132 is processing for setting control input amounts in accordance with the control input reference value and the control input deviation value.

In step 130, the ECU 20 determines the ignition timing Ig.

$$Ig = IgB + \Delta Ig$$

In step 132, the ECU 20 calculates the auxiliary air flow rate Duty.

$$\text{Duty} = \text{DutyB} + \Delta \text{Duty}$$

The ignition timing Ig and the auxiliary air flow rate Duty set as mentioned above are sent to the ignition circuit 26 and the ISC valve 44 respectively.

Figure 9:
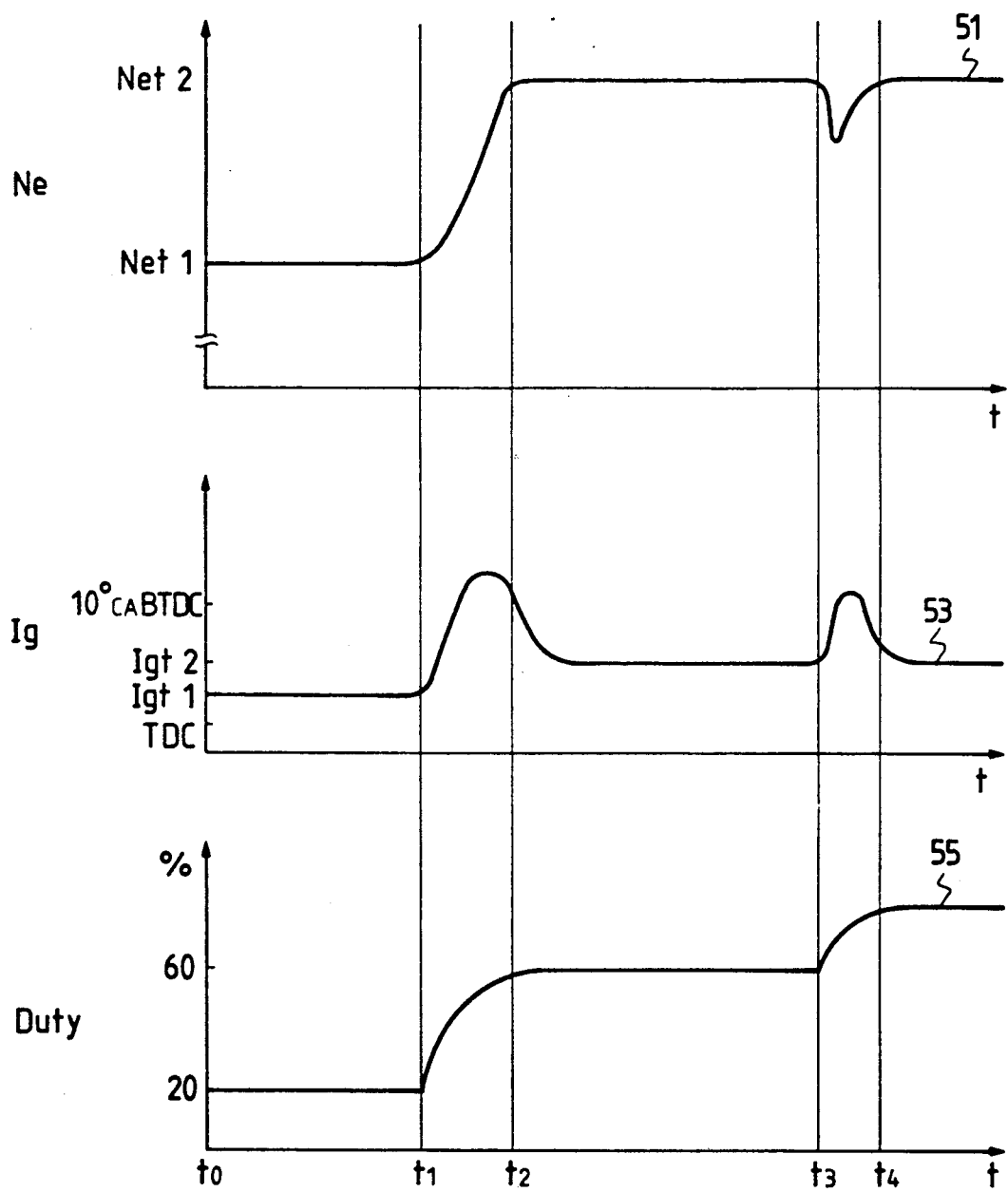
FIG. 9 shows a time chart of the embodiment.

FIG. 9 shows a time chart of the embodiment. As shown in FIG. 9, the ignition timing Ig and the auxiliary air flow rate Duty are controlled so that the engine speed Ne is equal to the target engine speed Net during idling. Moreover, in an idling stable condition (t0–t1, t2–t3, and after t4), the ignition timing Ig is controlled so that it is set to the target ignition timing Igt1 or Igt2 corresponding to the target engine speed Net1 and Net2 at respective timings. Therefore, vibrations of the engine 10 and increase in exhaust emissions due to deviation of the ignition timing Ig from the predetermined range are prevented.

Moreover, in the transition state of idling (t1–t2, and t3–t4) caused by change in the target engine speed (Net1→Net2) or change in load, etc., the ignition timing Ig showing rapid response is controlled, so that convergence of the engine speed Ne to the target engine speed Net is improved.

Further, the ignition timing output value Ig0 is obtained using the transfer function G3(s) to realize two-input two-output control system. This makes it is easy to apply the algorithm of the optimum regulator to the engine speed control.

In step 118 shown in FIG. 8, the compensation values d1 and d2 are calculated under the condition that the integration values sum1 and sum2 are set to zero as initial values. However, it is possible that results of the following equations resolved with respect to the integration values sum1 and sum2 can be set to the integration values sum1 and sum2 as initial values.

$$\begin{pmatrix} sum1 \\ sum2 \end{pmatrix} = K^{-1} \left\{ \begin{pmatrix} \Delta Ig \\ \Delta Duty \end{pmatrix} - F \begin{pmatrix} X1 \\ X2 \\ X3 \end{pmatrix} \right\} \text{ Where}$$

$$K = \begin{pmatrix} k1 & k2 \\ k3 & k4 \end{pmatrix} F = \begin{pmatrix} f1 & f2 & f3 \\ f4 & f5 & f6 \end{pmatrix}$$

Figure 1:
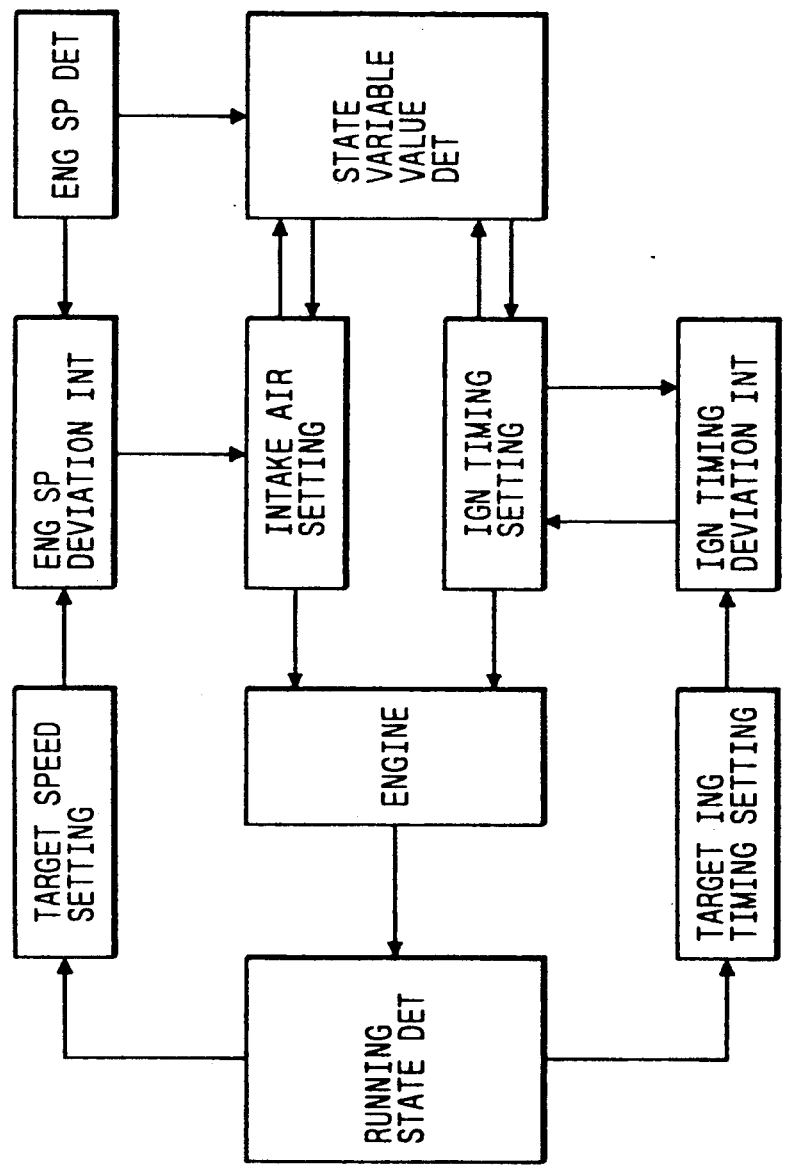
FIG. 1 is a functional block diagram of this embodiment.

FIG. 1 is a functional block diagram showing the above-mentioned functions and relations therebetween.

In the above-mentioned embodiment, the control of engine speed of the engine 10 is applied to idling speed control. However, it is possible to apply this control of the invention to engine speed control of a cogeneration system.

What is claimed is:

1. An engine speed control apparatus of an engine, comprising:
    (a) engine speed detection means for detecting an engine speed of said engine;
    (b) running condition detection means for detecting a given running condition of said engine;
    (c) target speed setting means responsive to said running condition detection means for setting a target engine speed;
    (d) target ignition timing setting means responsive to said running condition means for setting target ignition timing;
    (e) first integration means for obtaining a first integrated value of deviation of said engine speed from said target engine speed;
    (f) second integration means for obtaining a second integrated value of deviation of said ignition timing from said target ignition timing;
    (g) intake air detection means for detecting a flow rate of intake air of said engine;
    (h) state variable determining means for determining a value of a predetermined state variable, presenting an internal condition of said engine in accordance with said engine speed, said ignition timing, said flow rate of intake air;
    (i) intake air flow rate setting means for determining said flow rate of intake air supplied to said engine in accordance with said value of said predetermined state variable, said first integrated value, and said second integrated value; and
    (j) ignition timing setting means for setting said ignition timing in accordance with said value of said predetermined state variable, said first and second integrated values.

2. An engine speed control apparatus of an engine as claimed in claim 1, wherein said target ignition timing setting means comprises a first target ignition setting means for determining said target ignition timing in accordance with said target engine speed.

3. An engine speed control apparatus of an engine claimed in claim 1, wherein said ignition setting means comprises ignition timing output value setting means for determining an output value of said ignition timing in accordance with said ignition timing and a predetermined transmission function, and a first ignition timing setting means for setting said ignition timing in accordance with a deviation of said ignition timing from said ignition timing output value.

4. An engine speed control apparatus of an engine as claimed in claim 1, wherein said conditional variation detection means comprises storing means for storing a dynamic model predetermined in accordance with relations between said engine speed, said ignition timing, and said flow rate of said intake air.

5. An engine speed control apparatus of an engine, comprising:
    (a) engine speed detection means for detecting an engine speed of said engine;
    (b) running condition detection means for detecting a given running condition of said engine;
    (c) target speed setting means responsive to said running condition detection means for setting a target engine speed;
    (d) target ignition timing setting means responsive to said running condition means for setting target ignition timing;
    (e) first integration means for obtaining a first integrated value of deviation of said engine speed from said target engine speed;
    (f) second integration means for obtaining a second integrated value of deviation of said ignition timing from said target ignition timing;
    (g) intake air detection means for detecting a flow rate of intake air of said engine;
    (h) state-of-engine estimation means for estimating a state of said engine in response to said engine speed, said ignition timing, said flow rate of intake air in accordance with a predetermined relation;
    (i) intake air flow rate setting means for determining said flow rate of intake air supplied to said engine in accordance with said value of said predetermined state variable, said first integrated value, said second integrated value; and
    (j) ignition timing setting means for setting said ignition timing in accordance with said value of said predetermined state variable, said first and second integrated values.

* * * * *